United States Patent [19]

Hitzler et al.

[11] 4,059,574

[45] Nov. 22, 1977

[54] SYMMETRIC AZO-BIS-MERCAPTO COMPOUNDS

[75] Inventors: Otto Hitzler, Erzhausen; Horst Pennewiss, Darmstadt-Neu-Kranichstein; August Froelich, Darmstadt-St. Stephen-Siedlung; Gerhard Markert, Ober-Ramstadt-Eiche; Winfried Wunderlich, Rossdorf, all of Germany

[73] Assignee: Rohm GmbH, Darmstadt, Germany

[21] Appl. No.: 678,699

[22] Filed: Apr. 20, 1976

[30] Foreign Application Priority Data

Apr. 26, 1975 Germany ............................ 2518622

[51] Int. Cl.² .................. C07C 107/02; C08L 67/06; C10L 1/14
[52] U.S. Cl. ........................................ 260/192; 44/62; 252/9; 252/49.6; 252/50; 252/56 R; 260/823; 260/865; 260/872; 260/887; 260/896; 260/897 R; 260/898; 260/899; 560/147
[58] Field of Search .................................. 260/192

[56] References Cited

U.S. PATENT DOCUMENTS 3,655,391  4/1972  Merli et al. ................. 260/192 X

*Primary Examiner*—Floyd D. Higel
*Attorney, Agent, or Firm*—Curtis, Morris & Safford

[57] ABSTRACT

Symmetric azo-bis-mercapto compounds of the formula

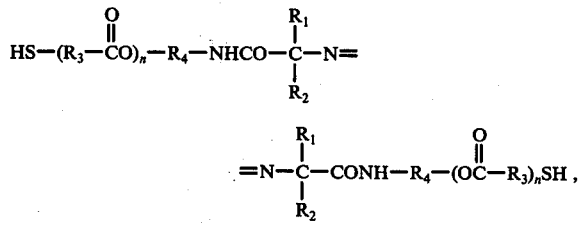

wherein $R_1$ and $R_2$ are methyl or ethyl, $R_3$ and $R_4$ are the same or different alkylene having 1 to 4 carbon atoms, and $n$ is 0 or 1, and a method for forming block copolymers of vinyl monomers in a two-step process employing such compounds as polymerization initiators.

4 Claims, No Drawings

SYMMETRIC AZO-BIS-MERCAPTO COMPOUNDS

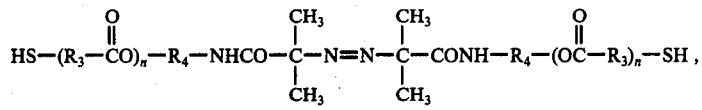

The present invention relates to symmetric azo-bis-mercapto compounds and to a method for preparing block copolymers therewith. More in particular, the invention relates to such compounds in which the azo group is bound to a quaternary carbon atom and in which a mercapto group is present in each of the residues bound to the azo group.

The new compounds combine two functions known per se: they decompose by thermal excitation forming molecular nitrogen and two free radical fragments which can initiate the polymerization of unsaturated monomers. The mercapto groups fulfill the known function of a chain transfer agent in the free radical polymerization of unsaturated monomers.

Both molecular functions can serve, in different ways, for the initiation of macromolecular chains in free radical polymerization. The new compounds can, therefore, be viewed as a coupling member for two macromolecules. Compounds with such a coupling function are valuable auxiliary agents in the free radical polymerization of unsaturated monomers. With their aid, high molecular weight compounds with particular properties can be prepared by the joining of several macromolecular chains. For example, block copolymers can be formed from two macromolecular chains of different structure, or polymers of increased molecular uniformity can be formed from macromolecular chains of differing chain lengths.

The symmetric azo-bis-mercapto compounds of the invention have the general formula $$HS-(R_3-\overset{O}{\overset{\|}{C}}O)_n-R_4-NHCO-\overset{R_1}{\underset{R_2}{\overset{|}{C}}}-N=$$

$$=N-\overset{R_1}{\underset{R_2}{\overset{|}{C}}}-CONH-R_4-(O\overset{O}{\overset{\|}{C}}-R_3)_nSH,$$

wherein $R_1$ and $R_2$ are methyl or ethyl, $R_3$ and $R_4$ are the same or different alkylene groups having 1 to 4 carbon atoms, and $n$ is 0 or 1.

By thermal excitation, the new compounds decompose to form radicals of the formula

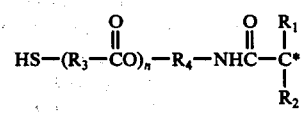

which can initiate the polymerization of vinyl monomers. The polymer chains so formed contain a mercapto group at the terminus thereof, which mercapto group acts as a chain transfer agent and so becomes the starting point of a second free radical chain. Each of the above-identified radicals is thus an initiator for two polymer chains. If the two polymer chains are composed of different monomers, a block copolymer is formed.

The most preferred compounds according to the invention are of the formula $$HS-(R_3-\overset{O}{\overset{\|}{C}}O)_n-R_4-NHCO-\overset{CH_3}{\underset{CH_3}{\overset{|}{C}}}-N=N-\overset{CH_3}{\underset{CH_3}{\overset{|}{C}}}-CONH-R_4-(O\overset{O}{\overset{\|}{C}}-R_3)_n-SH,$$

wherein $R_3$ and $R_4$ are ethylene or propylene and $n$ is 0 or 1.

The new azo-bis-mercapto compounds can be prepared by methods which are generally employed for the preparation of azo compounds. The introduction of the azo group thus requires no description here. The mercapto groups can be prepared from hydroxy groups by chlorination and conversion to the xanthogenate, followed by subsequent hydrolysis. This synthetic technique is illustrated below by an exemplary description of the conversion of azo-bis-isobutyric acid-N-hydroxyethyl amide to azo-bis-isobutyric acid-N-mercaptoethyl amide:

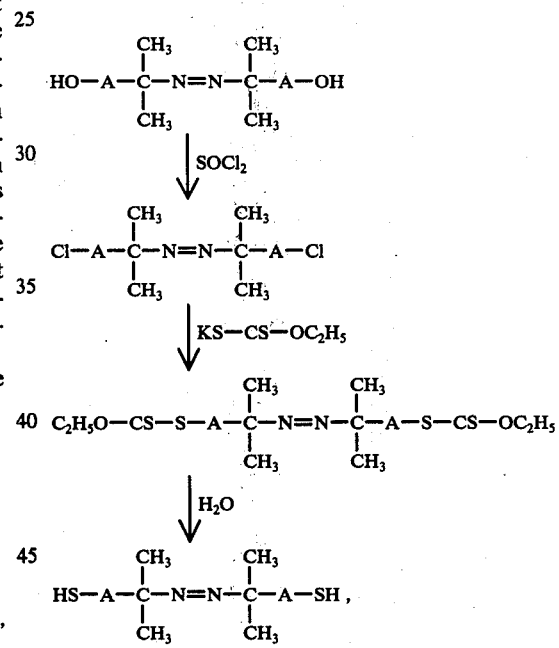

wherein A in each case stands for the group —CO—NH—C$_2$H$_4$—.

2,2'-azo-bis-isobutyric acid-N-(mercaptoacyloxyalkyl)-amides can be prepared by an acid-catalyzed esterification of 2,2'-azo-bis-N-hydroxyalkyl amides with mercapto acetic acid, mercapto propionic acid, or similar mercapto carboxylic acids. It is important that the esterification temperature not exceed 80° C., since otherwise decomposition into free radicals begins. The esterification can be carried out, for example, in the presence of low-boiling water-entraining agents such as chloroform or benzene and the water of esterification can be cycled out azeotropically.

The azo-bis-isobutyric acid-N-hydroxyalkyl amide used as the starting material is easily obtainable by aminolysis of the known 2,2'-azo-bis-isobutyric acid methyl ester or -ethyl ester with amino alcohols. The aforementioned acids[+] are known from J. Thiele et al., Annalen der Chemie, 290, 30 – 39 (1896).

+) esters

The azo-bis-mercapto compounds according to the invention are prepared, worked up, and stored under conditions under which the azo group does not decompose with the formation of free radicals. They are used in the preparation of vinyl polymers or vinyl copolymers by the free radical polymerization of vinyl monomers in the same way as are other azo initiators. They are dissolved in the vinyl monomers, or in mixtures of the monomers with a suitable solvent, and are subjected to conditions under which polymerization begins by decomposition of the azo compounds into free radicals. In this way, the azo groups, as well as the mercapto groups, become reactive and macromolecules are formed in each case from two similarly constructed polymer chains.

For the preparation of block copolymers, which comprise two macromolecular chains formed from different monomers, a two-step polymerization technique is employed. In the first step, a vinyl monomer or a mixture of several monomers is polymerized, in the presence of the azo-bis-mercapto compounds of the present invention and in the presence of a further free radical forming compound, under conditions such that the last-mentioned compound decomposes with the formation of free radicals but the azo group of the azo-bis-mercaptan remains intact. Thus, polymerization can be carried out with a redox system formed between organic peroxides and aromatic amines, for example dibenzoyl peroxide and dimethyl toluidine, at temperatures between 0° C. and 50° C., since the azo-bis-mercaptans of the present invention first decompose at about 80° C. - 100° C. with the formation of free radicals. The polymerization can also be carried out in the aforementioned lower temperature region employing azo-isobutyric acid-diethyl ester or -dinitrile, tert.-butyl perpivalate, tert.-butyl peroctoate, or dilauroyl- or dibenzoyl-peroxide. Under these conditions, the mercapto groups perform their chain transfer function and polymer molecules of the structure

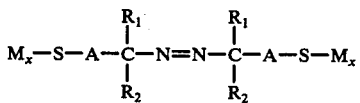

are formed, wherein A is the group —CONH—R$_4$—(O—CO—R$_3$)$_n$ and M$_x$ represents a macromolecular chain which is formed from a large number of the same or different monomer units. In the second reaction step, the polymer obtained is dissolved in a different monomer or in a mixture of other different monomers and subjected to conditions under which the azo group is cleaved to form molecular nitrogen and macromolecules having free radical terminal groups. The polymerization of the monomers in the second step is initiated at these groups, whereby a different macromolecular chain is formed than is formed in the first step. The copolymer prepared in this way contains a small amount, for example about 10 percent, of a polymer without a block structure, which polymer comprises only the monomers of the first step. The monomers used in the first and second steps can differ in their hydrophilicity or in other properties. Block copolymers containing hydrophilic and hydrophobic molecular segments are useful, for example, as emulsifying agents for the distribution of a hydrophilic phase in a hydrophobic medium or vice versa.

The above-described polymerization techniques are not limited to particular vinyl monomers. However, only those vinyl monomers or mixtures of vinyl monomers in which the azo-bis-mercapto compound is soluble come into consideration. Such monomers are predominantly water-insoluble monomers which can be polymerized by free radical polymerization, for example esters of acrylic acid or methacrylic acid and aliphatic alcohols having 1 to 20 carbon atoms. These alcohols may optionally contain further functional groups such as hydroxy groups, amino groups, ether groups, and the like. Further suitable monomers are the nitriles, amides, or N-alkyl amides of acrylic acid or methacrylic acid, these acids per se, other unsaturated mono- or di-carboxylic acids, styrene, α-methyl styrene, vinyl toluene, vinyl esters of aliphatic carboxylic acids, vinyl chloride, vinylidene chloride, butadiene, isoprene, and other olefins. The invention has particular significance for the preparation of oil-soluble polymers or copolymers of acrylic acid esters or methacrylic acid esters of fatty alcohols having 8 to 20 carbon atoms, optionally in admixture with minor amounts of other monomers such as vinyl pyrrolidone, vinyl imidazole, dimethyl aminoethyl methacrylate, or similar nitrogen-containing monomers. Such polymers or copolymers are useful additives for lubricating oils or heating oils.

In the following Examples, given by way of illustration, the preparation and use of the azo-bis-mercaptans of the present invention are shown in typical embodiments.

Preparation of 2,2'-Azo-Bis-Isobutyric Acid-N-Hydroxypropyl Amide (as a starting material for the syntheses described in Examples 1-3)

388 g (1.5 mol) of azo-bis-isobutyric acid-diethyl ester and 450 g (6 mols) of aminopropanol were mixed with 300 ml of methanol and heated for 40 hours in a water bath at 50° C. 248.4 g (53 percent of theory) of 2,2'-azo-bis-isobutyric acid-N-hydroxypropyl amide (m.p. = 148° C.) crystallized from the reaction mixture.

EXAMPLE 1

Preparation of 2,2'-Azo-Bis-Isobutyric Acid-N-(3-Mercapto-Acetoxypropyl)-Amide

A solution of 316.4 g (1 mol) of 2,2'-azo-bis-isobutyric acid propanolamide (prepared by the aminolysis of 2,2'-azo-bis-isobutyric acid ethyl ester, m.p. = 150° - 151° C.), 276 g (3 mols) of thioglycollic acid, and 10 g of methane sulfonic acid in 2500 ml of chloroform is boiled on a water bath in a 4-liter round-necked flask equipped with a stirrer, thermometer, and a reflux condenser having a water separator and provided with a T-piece for the introduction of nitrogen as a protective gas. The water formed in an amount of about 40 ml is separated.

The esterification takes about 3 hours. Subsequently, the cooled solution is treated with gaseous ammonia and the ammonium salt is removed by filtration. The filtrate is freed of chloroform in vacuum at 40° C. The residue is dissolved in toluene and filtered. After washing the toluene solution three times with 2 percent sodium bicarbonate solution, the solution is dried with sodium sulfate and the toluene is removed under vacuum, with gradual heating to 40° C. The residue which crystallizes on standing in a nitrogen atmosphere has a melting point of 54° - 55° C. (yield = 50 percent of theory). Iodometric determination establishes a purity of more than 92 percent. IR and NMR spectra correspond with the structure for 2,2'-azo-bis-isobutyric acid-N-(3-mercapto-acetoxypropyl)-amide. The decomposition temperature, determined by means of +)is about 100° C. On heating to 120° C., the theoretical amount of nitrogen is determined azotometrically.

+) differential scanning calorimetry

Elemental Analysis:
    Percent C Calculated: 46.5; Found: 46.8
    Percent H Calculated: 6.9; Found: 7.1
    Percent S Calculated: 13.8; Found: 13.4

EXAMPLE 2

Preparation of 2,2'-Azo-Bis-Isobutyric Acid-N-(2-Mercapto-Acetoxy-ethyl)-Amide

An oily liquid, $n_D^{20} = 1.4978$, is obtained according to the process described in Example 1 in about a 30 percent yield from 2,2'-azo-bis-isobutyric acid-N-(2-hydroxyethyl)-amide (prepared by the aminolysis of azo-bis-isobutyric acid-ethyl ester with ethanolamine, m.p. = 145° – 146° C.) by esterification of the ethyl derivative with thioglycolic acid. The uniformity of the substance is demonstrated by means of thin layer chromatography. The IR-spectrum corresponds to the expected structure.

EXAMPLE 3

Preparation of 2,2'-Azo-Bis-Isobutyric Acid-N-(2-Mercaptoethyl)-Amide 2,2'-azo-bis-isobutyric acid-N-(2-hydroxyethyl)-amide (cf. Example 2) can be converted into 2,2'-azo-bis-isobutyric acid-N-(2-chloroethyl)-amide with the theoretical amount of thionyl chloride in dimethyl formamide at room temperature after a 20 hour reaction followed by pouring into an ice/water mixture. After recrystallization from ethanol/water, the compound is obtained in 70 percent yield (m.p. = 103° C.). This chloroethyl derivative can be condensed in a 10 percent alcoholic solution with a three-fold theoretical amount of potassium ethyl xanthogenate at 35° C. to form 2,2'-azo-bis-isobutyric acid-N-(2-xanthogenatoethyl)-amide. The product obtained after several days' reaction by combination of this alcoholic solution with water is recrystallized from ethanol and dried (m.p. = 89° C.). The pure xanthogenate (49.7 g, 0.1 mol) is then introduced in portions, with stirring at room temperature, into a solution of 20.6 g (0.2 mol) of diethylene triamine in 500 ml of ethanol. The reaction vessel is rinsed with nitrogen during the process. After a 20-hour reaction, the mixture is cooled to 10° to 15° C. and 330 ml of 2 N HCl-solution is added dropwise. The alcohol is then removed at low temperature under vacuum and the residue is extracted with methylene chloride. After washing the extract with dilute HCl and water, it is dried over sodium sulfate and the solvent is removed under vacuum. After recrystallization from an alcohol-ether mixture, 2,2'-azo-bis-isobutyric acid-N-(2-mercaptoethyl)-amide is obtained in 80 percent yield (m.p. = 90° – 91° C.).

By thin layer chromatographic analysis (using Merck silica gel plates, toluene/methanol 60:40, fixation with iodine vapor), the product is uniform. Iodometric determination establishes a purity above 95 percent. On heating the substance in an azotometer at 120° C., the theoretical amount of nitrogen is cleaved. IR and NMR spectra correspond with the expected structure.

Elemental Analysis:
    Percent C Calculated: 45.0; Found: 44.8
    Percent H Calculated: 7.5; Found: 7.6
    Percent S Calculated: 20.0; Found: 19.6

EXAMPLE 4

Preparation of a Block-Copolymer Having a Poly-(Decylmethacrylatemethylmethacrylate 1:1)-Block and a Polydecylmethacrylate Block First step: 110 g of decylmethacrylate, 110 g of methylmethacrylate, 6.9 g of 2,2'-azo-bis-isobutyric acid-N-(3-mercaptoacetoxypropyl)-amide, and 0.11 g of azo-isobutyric acid diethyl ester are weighed into a one liter four-necked flask equipped with a stirrer, thermometer, reflux condenser, and means for introducing and removing nitrogen.

A mixture comprising 110 g of decylmethacrylate, 110 g of methylmethacrylate, 10.7 g of 2,2'-azo-bis-isobutyric acid-N-(3-mercaptoacetoxypropyl)-amide, and 0.22 g of azo-isobutyric acid diethyl ester was then added dropwise in the course of 3.5 hours at 74° C. under a nitrogen atmosphere. After three hours, the polymerization was interrupted at a conversion of 63 percent by cooling. The polymer was precipitated with methanol and dried in a vacuum drying chamber at about 200 – 1 mmHg at 40° C. for 4 days. $\eta_{sp}/c$ (measured in chloroform at 20° C.) = 15.5 ml/g. Nitrogen (according to Kjeldahl) = 0.26 percent = 4.3 percent of 2,2'-azo-bis-isobutyric acid-N-(3-mercaptoacetoxypropyl)-amide by weight of polymer. Nitrogen (azotometric) = 0.25 percent = 4.2 percent of 2,2'-azo-bis-isobutyric acid-(3-mercaptoacetoxypropyl)-amide by weight of polymer.

Second step: 62.4 g of the product of the first step were dissolved overnight at 40° C. in 237.6 g of decylmethacrylate (solution A).

85 g of butyl acetate were introduced into a 500 ml four-necked flask equipped with a stirrer, thermometer, reflux condenser, and means for introducing and removing nitrogen. 10 g of solution A and 15 g of butyl acetate were added thereto at 110° C. Then, 90 g of solution A were introduced over a period of 3.5 hours at 100° C. under a nitrogen atmosphere. After 16 hours, a conversion of 91 percent was reached. The polymer so obtained was isolated by precipitation with methanol and dried. $\eta_{sp}/c$ (measured in chloroform at 20° C.) = 53.4 ml/g. 10 g of the isolated polymer were dissolved at 90° C. in octane. After cooling and centrifugation, 0.83 g of unchanged material from the first step was recovered. No polydecylmethacrylate homopolymer could be demonstrated. The material purified in this manner is a block copolymer with the structure indicated in the heading and having a weight ratio of the blocks of 20:80.

EXAMPLE 5

Preparation of a Block-Copolymer from a Poly(Decylmethacrylatedimethylaminoethyl methacrylate 1:1)-Block and a Polydecylmethacrylate Block Example 4 was repeated but methylmethacrylate was replaced by the same amount of dimethylaminoethyl methacrylate and 2,2'-azo-bis-isobutyric acid-N-(3-mercaptoacetoxypropyl)-amide was replaced by the same amount of 2,2′-azo-bis-isobutyric acid-N-(2-mercaptoethyl)-amide.

First step: Conversion was 98 percent. The polymer was employed for the second step without further purification. $\eta_{sp}/c$ (measured in chloroform at 20° C.) = 16 ml/g. Nitrogen (azotometric) = 0.33 percent ≈ 3.8 percent of 2,2′-azo-bis-isobutyric acid-N-2-mercaptoethyl)-amide by weight of polymer.

Second step: Conversion was 90 percent. $\eta_{sp}/c$ (measured in chloroform at 20° C.) = 50 ml/g. The nitrogen content of the polymer, precipitated using methanol, was 1.21 percent by weight, corresponding with 9.9 percent by weight of incorporated dimethylaminoethyl methacrylate.

The block copolymer obtained has the structure given in the title, wherein the weight ratio of the blocks is 20:80.

In a corresponding manner, the following block-copolymers were prepared: poly-methylmethacrylate-poly-decylmethacrylate (10:90 percent by weight); poly-dimethylaminoethyl methacrylate-poly-decylmethacrylate (5:95 percent by weight); poly-vinyl pyrrolidone-poly-decylmethacrylate (10:90 percent by weight); poly-vinylimidazole-poly-decylmethacrylate (5:95 percent by weight); and poly-(vinylpyrrolidone-versatic acid-$C_{10}$ -ester)-poly-decylmethacrylate (10:10:80 percent by weight)

What is claimed is:
1. A symmetric azo-bis-mercapto compound of the formula

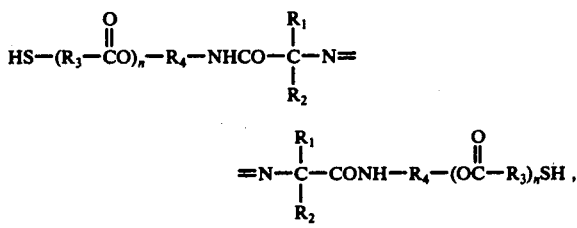

wherein $R_1$ and $R_2$ are methyl or ethyl, $R_3$ and $R_4$ are the same or different alkylene having 1 to 4 carbon atoms, and $n$ is 0 or 1.

2. A compound as in claim 1 wherein $R_1$ and $R_2$ are methyl, $R_3$ and $R_4$ are ethylene or propylene, and $n$ is 0 or 1.

3. A compound as in claim 1 wherein $n$ is 0.

4. A compound as in claim 1 wherein $n$ is 1.

* * * * *